Patented Sept. 4, 1923.

1,466,923

UNITED STATES PATENT OFFICE.

DENNIS A. CASEY, OF NEW ORLEANS, LOUISIANA.

BITUMINOUS MIXTURE.

No Drawing.     Application filed October 7, 1921. Serial No. 506,092.

*To all whom it may concern:*

Be it known that I, DENNIS A. CASEY, a citizen of the United States, residing at New Orleans, in the parish of Orleans and State of Louisiana, have invented certain new and useful Improvements in Bituminous Mixtures, of which the following is a specification.

The present invention relates to bituminous mixtures and the essential difference between the mixture herewith enclosed and those commonly in use is in the grading of the coarse aggregate and the percentage used.

My ideal mixture would contain exactly 50% of coarse aggregate graded as follows:—

Passing a ¾ inch circular opening and retained in a ½ inch circular opening. None;

Passing a ½ inch circular opening and retained on a ¼ inch circular opening, 50%:

Passing a ¼ inch circular opening and retained on a #10 mesh standard laboratory sieve, 50%.

However since it is difficult for any asphalt plant to produce a mixture which would contain the exact amount of coarse aggregate with the exact grading required as just mentioned and as imitations may be produced by varying slightly the quantity and grading, I have found that the bituminous mixture should contain from 44½% to 59½% of coarse aggregate graded in size as specified hereafter.

The method of manufacturing this mixture and placing the same on the street is the same as that employed with other bituminous mixtures of similar nature, except that this mixture does not require a "seal coat" or "squeegee coat" as is required in placing other coarse aggregate mixtures.

The general formula for this bituminous mixture is outlined as follows.

By Weight.

Bitumen _____ 5½% to 8½%
Filler _____ 4% to 6%
Fine aggregate_____ 31% to 41%
Coarse aggregate___ 44½% to 59½%

The bitumen may be either asphaltic, semi-asphaltic, coal tar or water gas tar.

The filler may be of any impalpably fine powder, not soluble in water, and which shall pass through a #200 mesh standard laboratory sieve.

The fine aggregate may be sand or stone particles or a mixture therefrom, all of which shall pass through a #10 mesh standard laboratory sieve but shall not pass through a #200 mesh standard laboratory sieve.

The coarse aggregate may be either gravel, crushed rock, stone or slag which shall be graded as follows:—

100% shall pass a #¾ inch circular opening.

Not more than 8% shall be retained on a sieve having #½ inch circular openings.

From 25% to 75% shall pass a #½ inch circular opening and be retained on a #¼ inch circular opening.

From 25% to 75% shall pass a #¼ inch circular opening and be retained on a #10 mesh standard laboratory sieve.

Having thus described my invention what I claim as new is:—

1. A mixture consisting of 5½% to 8½% by weight of bitumen, 4% to 6% of a filler, 31% to 41% of a fine aggregate and 44½% to 59½% of coarse aggregate.

2. A mixture consisting of 5½% to 8½% of bitumen, 4% to 6% of a filler, 31% to 41% of a fine aggregate capable of passing through a #10 mesh standard laboratory sieve but not through a #200 mesh standard laboratory sieve, and 44½% to 59½% of a coarse aggregate, 100% of which is capable of passing through a #¾ inch circular opening, not more than 8% to be retained on a sieve having #½ inch circular opening, from 25% to 75% capable of passing through a #½ inch circular opening and being retained on a #¼ inch circular opening, and from 25% to 75% capable of passing a #¼ inch circular opening and being retained on a #10 mesh standard laboratory sieve.

In testimony whereof I affix my signature in presence of two witnesses.

DENNIS. A. CASEY.

Witnesses:
    ED. H. DONLON,
    J. E. MITCHELL.